United States Patent
Mount et al.

(10) Patent No.: US 8,211,302 B2
(45) Date of Patent: Jul. 3, 2012

(54) FILTER ASSEMBLY

(75) Inventors: John V. Mount, Washington, IL (US);
Eric P. Jakubiak, Geneva, IL (US);
Bryan A. Johnson, Oswego, IL (US)

(73) Assignee: Caterpillar Inc., Peoria, IL (US)

(*) Notice: Subject to any disclaimer, the term of this patent is extended or adjusted under 35 U.S.C. 154(b) by 219 days.

(21) Appl. No.: 12/285,217

(22) Filed: Sep. 30, 2008

(65) Prior Publication Data
US 2010/0078375 A1    Apr. 1, 2010

(51) Int. Cl.
*B01D 35/153* (2006.01)
*B01D 35/157* (2006.01)

(52) U.S. Cl. .................. 210/232; 210/234; 210/235

(58) Field of Classification Search .................. 210/234, 210/444, 232
See application file for complete search history.

(56) References Cited

U.S. PATENT DOCUMENTS

| | | | |
|---|---|---|---|
| 2,418,777 A | 4/1947 | Le Clair | |
| 2,473,727 A * | 6/1949 | Robertson | 210/133 |
| 2,894,630 A | 7/1959 | Humbert, Jr. | |
| 3,070,232 A * | 12/1962 | Casaleggi | 210/90 |
| 3,166,498 A | 1/1965 | Otto, Jr. | |
| 3,235,085 A | 2/1966 | Humbert, Jr. | |
| 3,258,122 A | 6/1966 | Buckman et al. | |
| 3,262,570 A * | 7/1966 | Borsetti et al. | 210/266 |
| 3,266,628 A * | 8/1966 | Price | 210/94 |
| 3,283,907 A | 11/1966 | Whiting | |
| 3,502,214 A | 3/1970 | Mills et al. | |
| 3,507,391 A | 4/1970 | Rosaen | |
| 3,696,933 A * | 10/1972 | Pall et al. | 210/444 |
| 3,724,665 A | 4/1973 | Hall | |
| 4,732,678 A * | 3/1988 | Humbert, Jr. | 210/440 |
| 5,690,816 A | 11/1997 | Covington | |
| 5,698,093 A * | 12/1997 | Pyle et al. | 210/136 |
| 5,705,067 A * | 1/1998 | Sumi et al. | 210/234 |
| 2004/0069700 A1 | 4/2004 | Miller et al. | |
| 2009/0178964 A1 | 7/2009 | Cline et al. | |

FOREIGN PATENT DOCUMENTS

| | | |
|---|---|---|
| JP | 54123471 | 8/1979 |
| JP | 05038308 | 5/1993 |
| JP | 2003525113 | 8/1993 |
| JP | 06327909 | 11/1994 |
| JP | 08338218 A * | 12/1996 |

* cited by examiner

*Primary Examiner* — Thomas M Lithgow
(74) *Attorney, Agent, or Firm* — Finnegan, Henderson, Farabow, Garrett & Dunner LLP

(57) ABSTRACT

A filter assembly is disclosed having a filter base including an inlet and an outlet. The filter assembly also has a first valve disposed in the inlet, the first valve including a portion that protrudes from the filter base. The filter assembly additionally has a second valve disposed in the outlet, the second valve including a portion that protrudes from the filter base. The filter assembly also has a removably attachable filter configured to mechanically bias the first and second valves in an open position.

8 Claims, 3 Drawing Sheets

FILTER ASSEMBLY

TECHNICAL FIELD

The present disclosure is directed to an assembly and, more particularly, to a filter assembly.

BACKGROUND

Engine systems utilize hydraulic systems such as, for example, lubrication and fuel systems. Filters, such as oil and fuel filters, are typically used to filter out debris and impurities from the hydraulic systems, which enhances the service life and operation of an engine. Filters are typically detachable elements that are periodically replaced during the life of the engine. In large machines, it is often advantageous to locate filters relatively close to the ground and below the engine cavity, to facilitate easy replacement of the filters.

Filter replacements may be problematic if filters are located below the engine cavity. When the filter is removed, the fluid passage may become open to the environment and engine fluid may drain from the hydraulic system, which may cause environmental problems. Additionally, air may enter the hydraulic system, which may cause the hydraulic system to operate improperly.

A filter assembly is described in U.S. Patent Application Publication 2004/0069700 A1 (the '700 publication) by Miller et al. The '700 publication discloses a fuel filter, having an inlet and an outlet, which is removably attached to a fuel filter assembly. The filter assembly has a valve disposed at the outlet of the filter. The filter has a valve-engaging member that engages the valve when the filter is attached to the filter assembly. The valve allows flow downstream of the filter assembly when the filter is attached and blocks flow downstream of the filter assembly when the filter is detached.

Although the filter assembly of the '700 publication has a valve to block flow downstream of the filter assembly when the filter is detached, the filter assembly does not block flow upstream of the filter assembly when the filter is detached. When the filter is detached, fluid may leak from the filter base and cause environmental problems.

The present disclosure is directed to overcoming one or more of the shortcomings set forth above and/or other deficiencies in existing technology.

SUMMARY OF THE DISCLOSURE

In accordance with one aspect, the present disclosure is directed toward a filter assembly. The filter assembly includes a filter base including an inlet and an outlet. The filter assembly also includes a first valve disposed in the inlet, the first valve including a portion that protrudes from the filter base. The filter assembly additionally includes a second valve disposed in the outlet, the second valve including a portion that protrudes from the filter base. The filter assembly also includes a removably attachable filter configured to mechanically bias the first and second valves in an open position.

According to another aspect, the present disclosure is directed toward a method. The method includes closing a first and second valve of a filter base when detaching a filter from the filter base. The closing of the valves substantially prevents a fluid from flowing into and out of the filter base. The method also includes opening the first and second valves when coupling the filter to the filter base. The opening of the valves allows the fluid to flow between the filter base and the filter.

DETAILED DESCRIPTION

An engine system may include hydraulic systems such as, for example, a fuel system and a lubrication system. For example, the hydraulic system may supply fuel to an engine system, supply lubrication to an engine system, or return leaking fluid to a source. The hydraulic system may include components such as, for example, a fluid source, a pump, a filtration device, and additional engine system components.

The pump may be any suitable pump known in the art for pressurizing fluid such as, for example, a swash plate pump or an impeller pump. The pump may draw fluid from the fluid source and pressurize the fluid, thereby generating fluid flow through the hydraulic system. The pump may transfer fluid to the engine components located on the hydraulic circuit. The pump may include a case that houses pumping machinery.

Figure 1:
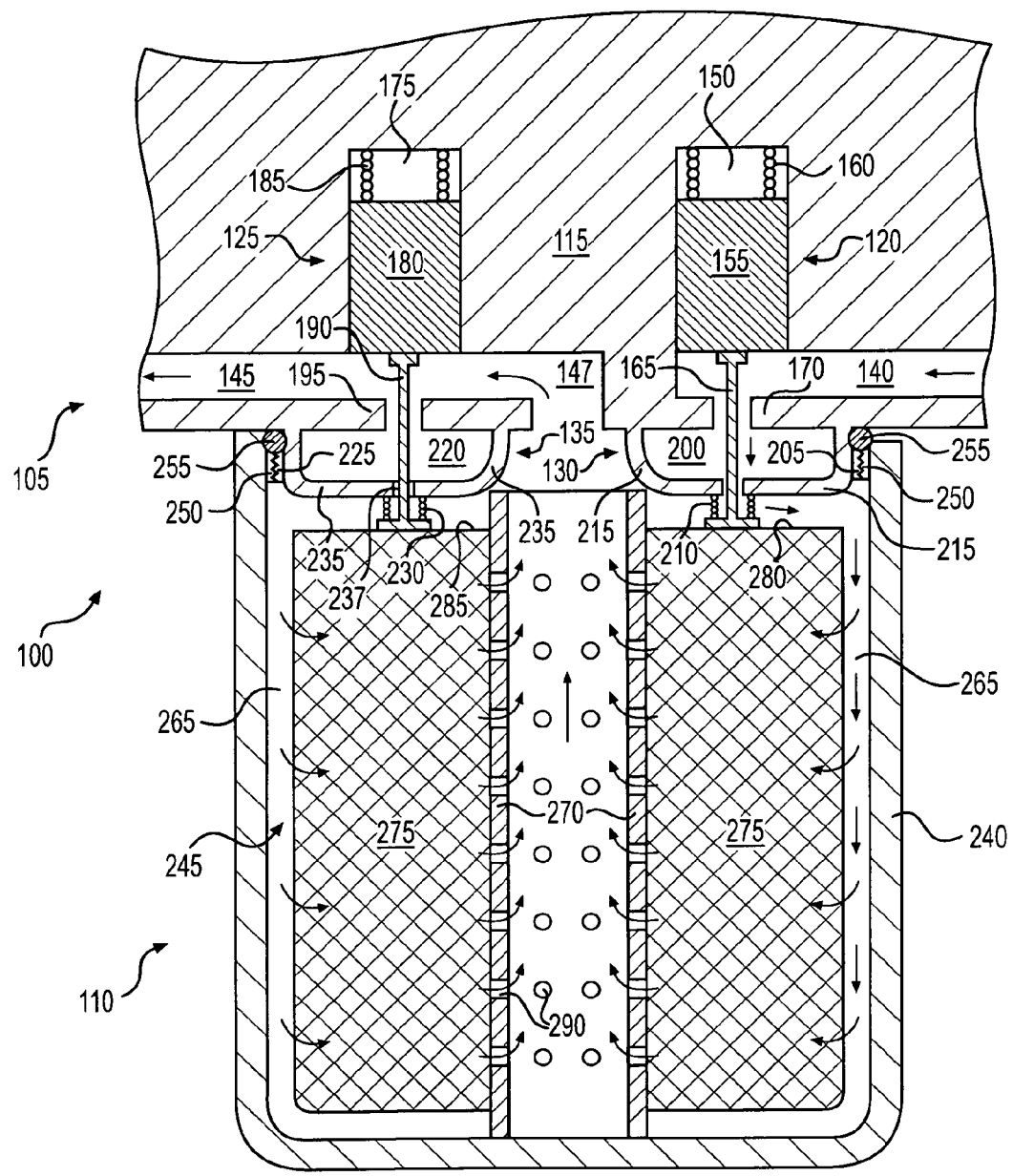
FIG. 1 is a cross-sectional illustration of an exemplary disclosed filter assembly.

The filtration device may be a filter assembly 100, as shown in FIG. 1. Filter assembly 100 may filter debris such as, for example, rust, dirt, and other particles from the fluid of the hydraulic system. Filter assembly 100 may include a filter base 105 and a filter 110.

Figure 2:
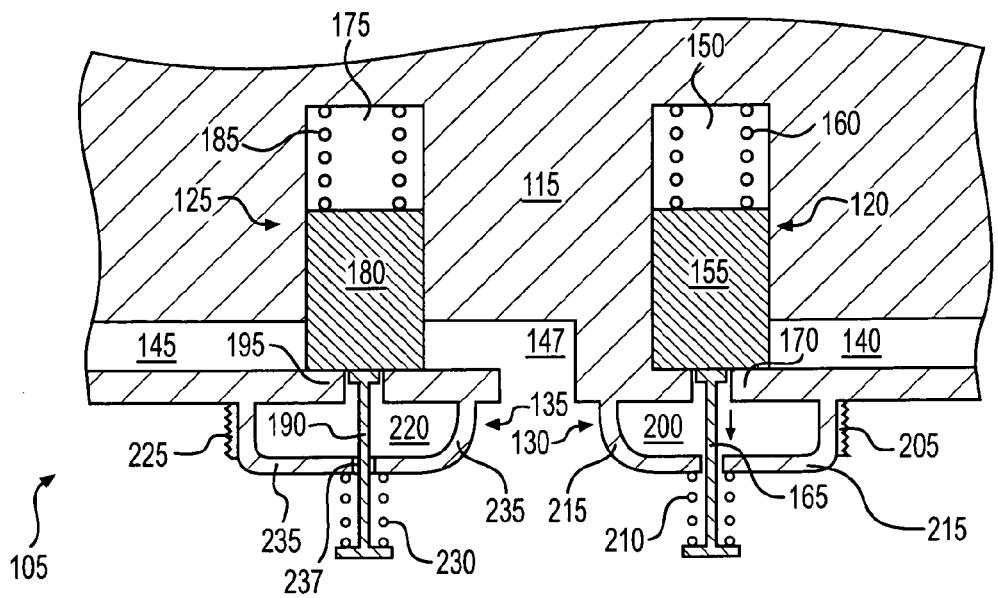
FIG. 2 is a cross-sectional illustration of an exemplary disclosed filter base of the filter assembly of FIG. 1.

Filter base 105 is illustrated in FIGS. 1 and 2. Filter base 105 may be a base structure that supports filter 110 on a machine and may fluidly connect filter 110 to a hydraulic system of the machine. Filter base 105 may include a housing 115, valve assemblies 120 and 125, and support members 130 and 135.

Housing 115 may be attached to a machine by any suitable technique such as, for example, bolting and/or welding, or may be an integral part of the machine. Housing 115 may structurally support the components of filter base 105. Housing 115 may include passages 140 and 145 and an inlet 147. Passages 140 and 145 may be fluidly connected to a hydraulic system. Passage 140 may transfer fluid flow downstream from an engine system component such as, for example, a pump or a pump case, toward filter base 105. Fluid may flow from filter 110 to passage 145 via inlet 147. Inlet 147 may thereby serve as an inlet of filter base 105. Passage 145 may transfer fluid flow downstream from filter base 105 toward an engine system component such as, for example, a fluid source. It is also contemplated that passages 140 and 145 may be fluidly connected to any engine system component of a hydraulic system.

Valve assembly 120 may be an outlet valve of filter base 105 that selectively allows and blocks fluid flow from passage 140 to filter 110. A portion of valve assembly 120 may be disposed in a recess 150 of housing 115 that may serve as a valve body. Valve assembly 120 may include a valve element 155, a spring 160, a protruding member 165, and a valve seat 170. Valve seat 170 may be an integral portion of housing 115 or may alternatively be attached to housing 115. Protruding member 165 may be attached to valve element 155 by any suitable technique known in the art such as, for example, by welding, and may protrude from filter base 105. Valve assembly 120 may be disposed in a first position, shown in FIG. 2, blocking fluid flow between passage 140 and filter 110. In the first position, spring 160 may bias valve element 155 toward valve seat 170 with a suitable amount of force to overcome resistance from fluid or debris that may be located within passage 140 and/or support member 130. Valve assembly 120 may also be disposed in a second position, shown in FIG. 1, allowing fluid flow between passage 140 and filter 110.

Valve assembly 125 may be similar to valve assembly 120 and may be an inlet valve of filter base 105 that selectively allows and blocks fluid flow from filter 110 to passage 145. A portion of valve assembly 125 may be disposed in a recess 175 of housing 115 that may serve as a valve body. Valve assembly 125 may include a valve element 180, a spring 185, a protruding member 190, and a valve seat 195. Protruding member 190 may protrude from filter base 105. Valve assembly 125 may be disposed in a first position, shown in FIG. 2, blocking fluid flow between filter 110 and passage 145. Valve assembly 125 may also be disposed in a second position, shown in FIG. 1, allowing fluid flow between filter 110 and passage 145.

Support member 130 may be an integral portion of housing 115 or may be alternatively attached to housing 115. Support member 130 may be configured to receive a portion of filter 110 and may guide a movement of protruding member 165 when valve assembly 120 moves between the first and second positions. Support member 130 may include a recess 200, a mating portion 205, a spring 210, and members 215. Recess 200 may serve as an outlet of filter base 105 that fluidly connects passage 140 and filter 110. Mating portion 205 may be any suitable element for mating with another surface such as, for example, threading. Spring 210 may be attached between members 215 and protruding member 165 and may urge protruding member 165 to protrude from filter base 105, as shown in FIG. 2.

Support member 135 may be an integral portion of housing 115 or may alternatively be attached to housing 115. Support member 135 may be configured to receive a portion of filter 110 and may guide a movement of protruding member 190 when valve assembly 125 moves between the first and second positions. Support member 135 may include a recess 220, a mating portion 225, a spring 230, and members 235. Members 235 may include a seal 237 that makes a sealed connection around protruding member 190, blocking flow between filter 110 and recess 220. Spring 230 may be attached between members 235 and protruding member 190 and may urge protruding member 190 to protrude from filter base 105, as shown in FIG. 2.

Figure 3:
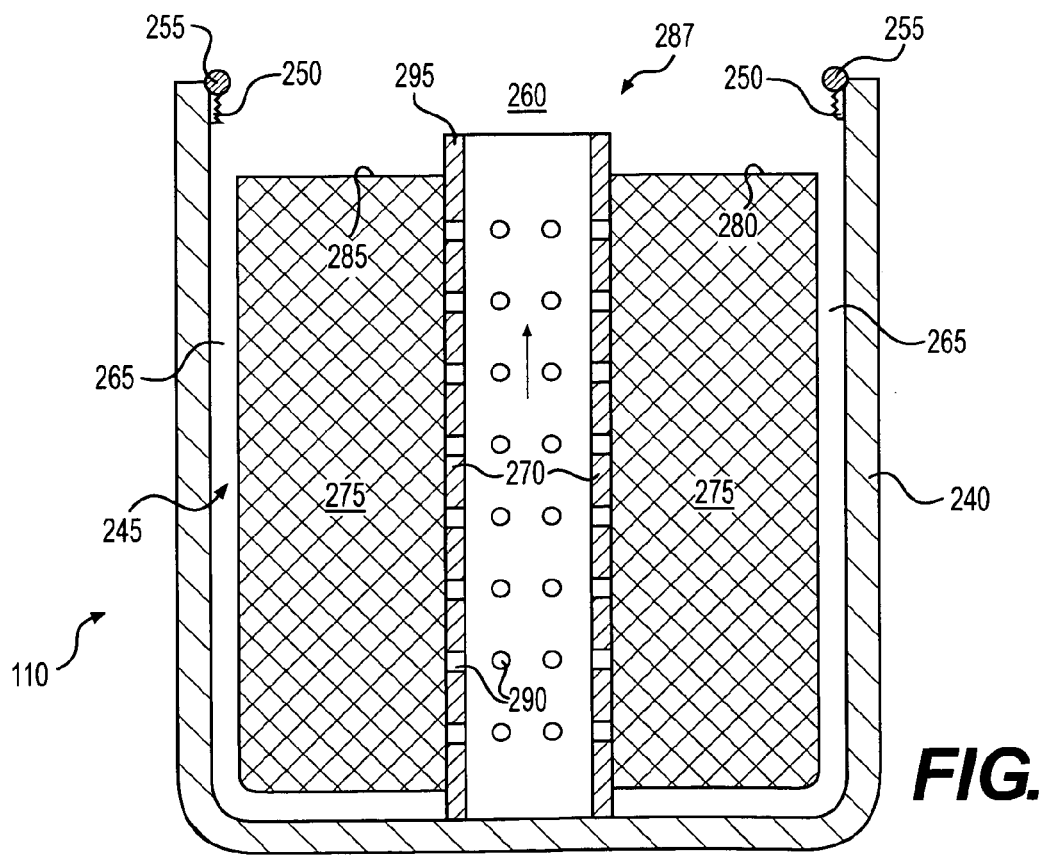
FIG. 3 is a cross-sectional illustration of an exemplary disclosed filter of the filter assembly of FIG. 1.

Filter 110 is illustrated in FIGS. 1 and 3. Filter 110 may be a removably attachable filter that filters fluid of a hydraulic system of a machine. Filter 110 may be any filter for a hydraulic system such as, for example, an oil filter or a fuel filter. Filter 110 may be any suitable shape for a removable filter such as, for example, a tubular-shaped or box-shaped filter. Filter 110 may include a housing 240, a filter element 245, a mating portion 250, and a seal 255.

Housing 240 may structurally support the elements of filter 110 and may be selectively coupled to filter base 105. Housing 240 may include an orifice 260 and a passage 265. Orifice 260 may be located at an end portion of housing 240, allowing support members 130 and 135 of filter base 105 to be received within an interior of housing 240. Passage 265 may extend circumferentially around filter element 245, fluidly connecting filter element 245 and recess 200.

Filter element 245 may include a member 270, a filter medium 275, and valve actuating surfaces 280 and 285. Filter element 245 may be disposed in housing 240 and may have an end portion 287 located adjacent to orifice 260. Member 270 may be attached to housing 240 and may be a hollow member including a plurality of perforations 290 arranged circumferentially around member 270. Filter medium 275 may be attached to member 270 and may extend circumferentially around member 270. Perforations 290 may fluidly connect filter medium 275 and an interior of member 270. Member 270 may also include a sealing portion 295 that may protrude from filter element 245. Filter medium 275 may be any suitable material for filtrating a fluid such as, for example, synthetic fiber. Filter medium 275 may be a replaceable filter medium that may be removed and replaced from housing 240, where housing 240 may be a reusable housing. It is also contemplated that the entire filter 110 may be replaceable. Valve actuating surfaces 280 and 285 may be located at end portion 287 of filter element 245. Valve actuating surface 280 may be configured to abut protruding member 165 of valve assembly 120, and valve actuating surface 285 may be configured to abut protruding member 190 of valve assembly 125.

Mating portion 250 may be located at end portion 287 of housing 240 and may be configured to secure housing 240 to filter base 105. Mating portion 250 may be attached to housing 240 and may be any suitable element for mating with another surface such as, for example, threading. Seal 255 may be any suitable seal for blocking fluid flow between two elements and may be attached to end portion 287 of housing 240.

INDUSTRIAL APPLICABILITY

The disclosed filter assembly may be used in any machine having fluids that require filtering. The disclosed filter assembly may be used in any machine having removable filters such as, for example, removable oil and fuel filters.

Figure 4:
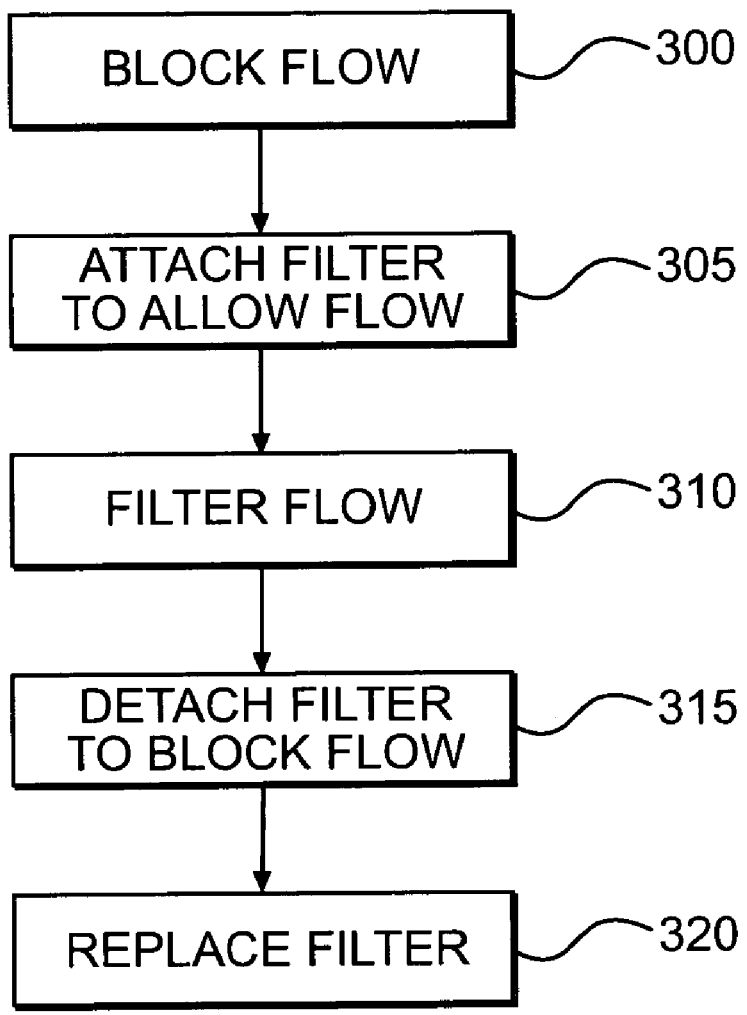
FIG. 4 is a flow chart of an exemplary disclosed method.

FIG. 4 provides a method for using filter assembly 100. In step 300, filter assembly 100 blocks flow. As shown in FIG. 2, filter 110 is detached from filter base 105 to substantially prevent fluid from flowing into and out of filter base 105. Spring 210 biases protruding member 165 downward and spring 160 biases valve element 155 against valve seat 170, thereby causing protruding member 165 to protrude from filter base 105. Valve element 155 is thereby spring-biased in a closed position and flow is blocked between passage 140 and recess 200, blocking flow from filter base 105 into filter 110. Spring 230 biases protruding member 190 downward and spring 185 biases valve element 180 against valve seat 195, thereby causing protruding member 190 to protrude from filter base 105. Valve element 180 is thereby spring-biased in a closed position and flow is blocked between inlet 147 and passage 145, blocking flow from filter 110 into filter base 105.

In step 305, filter 110 is attached to filter base 105 to mechanically bias valve assemblies 120 and 125 in an open position to allow fluid to flow between filter 110 and filter base 105. The mechanical bias of filter 110 overcomes the bias of springs 160, 185, 210, and 230 when filter 110 is coupled to filter base 105. As shown in FIG. 1, filter 110 is attached to filter base 105. Mating portion 250 of filter 110 is mated to mating portions 205 and 225 of filter base 105. Seal 255 may be pressed between housing 240 and filter base 105 and may substantially prevent fluid leakage between housing 240 and filter base 105. Sealing portion 295 of member 270 may also be pressed against members 215 and 235 to substantially prevent leakage between sealing portion 295 and members 215 and 235. As filter 110 is coupled to filter base 105, valve actuating surface 280 abuts protruding member 165 of valve assembly 120. The mechanical bias of filter 110 overcomes the spring bias of springs 160 and 210. Filter 110 thereby mechanically biases valve element 155 away from valve seat 170. Passage 140 is thereby fluidly connected to passage 265 of filter 110 via recess 200. Similarly, valve actuating surface 285 abuts protruding member 190 of valve assembly 125. The mechanical bias of filter 110 overcomes the spring bias of springs 185 and 230, thereby mechanically biasing valve element 180 away from valve seat 195. Passage 145 is thereby fluidly connected to the interior of member 270 by inlet 147.

In step 310, fluid is filtered through filter assembly 100. As shown by arrows in FIG. 1, pressurized fluid flows downstream from an engine system component to filter base 105 via passage 140. Fluid flows from passage 140 to passage 265, via recess 200. Fluid flows through filter medium 275 and into the interior of member 270 via perforations 290. Fluid flows from the interior of member 270 to passage 145 via inlet 147. Fluid may flow downstream from filter base 105 to another engine system component via passage 145.

In step 315, filter 110 is detached from filter base 105 to block flow. Filter 110 may be detached for maintenance such as, for example, an oil or fuel filter change. When filter 110 is detached, flow is blocked as in step 300. In step 320, filter 110 may be replaced with a replacement filter 110. Filter 110 is attached to filter base 105, again allowing flow as in step 305.

Filter assembly 100 may selectively block flow upstream of filter base 105 via valve assembly 120 and selectively block flow downstream from filter base 105 via valve assembly 125. Valve assemblies 120 and 125 may be mechanically seated when filter 110 is removed, substantially preventing back pressure from occurring in a hydraulic system, such as when fluid pressure is required to unseat a check valve. Valve assemblies 120 and 125 may also prevent leakage from passages upstream and downstream of filter assembly 100 when filter 110 is removed, substantially preventing environmental problems. Filter assembly 100 may also be located below a machine engine and close to the ground, making maintenance more efficient.

It will be apparent to those skilled in the art that various modifications and variations can be made to the disclosed filter assembly. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A filter assembly, comprising:
   a filter base including an inlet and an outlet;
   a first valve disposed in the inlet, the first valve including a portion that protrudes from the filter base;
   a second valve disposed in the outlet, the second valve including a portion that protrudes from the filter base;
   a removably attachable filter configured to mechanically bias the first and second valves in an open position, the filter having a central passageway located interior to the filter element, the central passageway being configured to convey fluid to a passageway outlet, the central passageway having a sealing portion at the passageway outlet, wherein an uppermost surface of the sealing portion is located below an uppermost surface of a housing of the filter, a radially outer side of the uppermost surface of the sealing portion being configured to be pressed against the filter base; and
   a sealing arrangement associated with the protruding portion of one of the first valve or the second valve and configured to block flow around the one of the first valve or the second valve in a direction substantially parallel to a longitudinal axis of the one of the first valve or the second valve when the one of the first valve or the second valve is in the open position.

2. The filter assembly of claim 1, further including a first spring configured to bias the first valve toward a first valve seat and a second spring configured to bias the second valve toward a second valve seat.

3. The filter assembly of claim 2, wherein the mechanical bias of the removably attachable filter overcomes the bias of the first and second springs when the removably attachable filter is attached to the filter base.

4. The filter assembly of claim 1, further including:
   a first support member;
   a second support member; and
   a first mating portion located on the first support member and a second mating portion located on the second support member.

5. The filter assembly of claim 4, wherein the first and second mating portions include threading.

6. The filter assembly of claim 1, further including a first valve actuating surface located on the removably attachable filter and a second valve actuating surface located on the removably attachable filter.

7. The filter assembly of claim 6, wherein the first valve actuating surface abuts the portion of the first valve that protrudes from the filter base and the second valve actuating surface abuts the portion of the second valve that protrudes from the filter base when the removably attachable filter is coupled to the filter base.

8. The filter assembly of claim 1, wherein the removably attachable filter is an oil filter or a fuel filter.

* * * * *